No. 787,709. PATENTED APR. 18, 1905.
C. W. WEISS.
INTERNAL COMBUSTION ENGINE.
APPLICATION FILED JULY 1, 1903.

Attest:
A. N. Jesbera
Martin Roberts

Inventor:
Carl W. Weiss
by Redding Kiddle & Greeley
Attys.

No. 787,709. Patented April 18, 1905.

UNITED STATES PATENT OFFICE.

CARL W. WEISS, OF NEW YORK, N. Y.

INTERNAL-COMBUSTION ENGINE.

SPECIFICATION forming part of Letters Patent No. 787,709, dated April 18, 1905.

Application filed July 1, 1903. Serial No. 163,845.

*To all whom it may concern:*

Be it known that I, CARL W. WEISS, a citizen of the United States, residing in the borough of Manhattan, in the city of New York, in the State of New York, have invented certain new and useful Improvements in Internal-Combustion Engines, of which the following is a specification, reference being had to the accompanying drawings, forming a part hereof.

This invention has for its object to increase the efficiency of internal-combustion engines, and relates more especially to the means for introducing the fuel basis of the charge and to the means for maintaining in the explosion-chamber or working cylinder the conditions best suited to the operation of the engine.

The invention will be more fully described hereinafter with reference to the accompanying drawings, in which, for purposes of explanation, it is illustrated as embodied in an internal-combustion engine which is in general of a well-known type.

Figure 1:
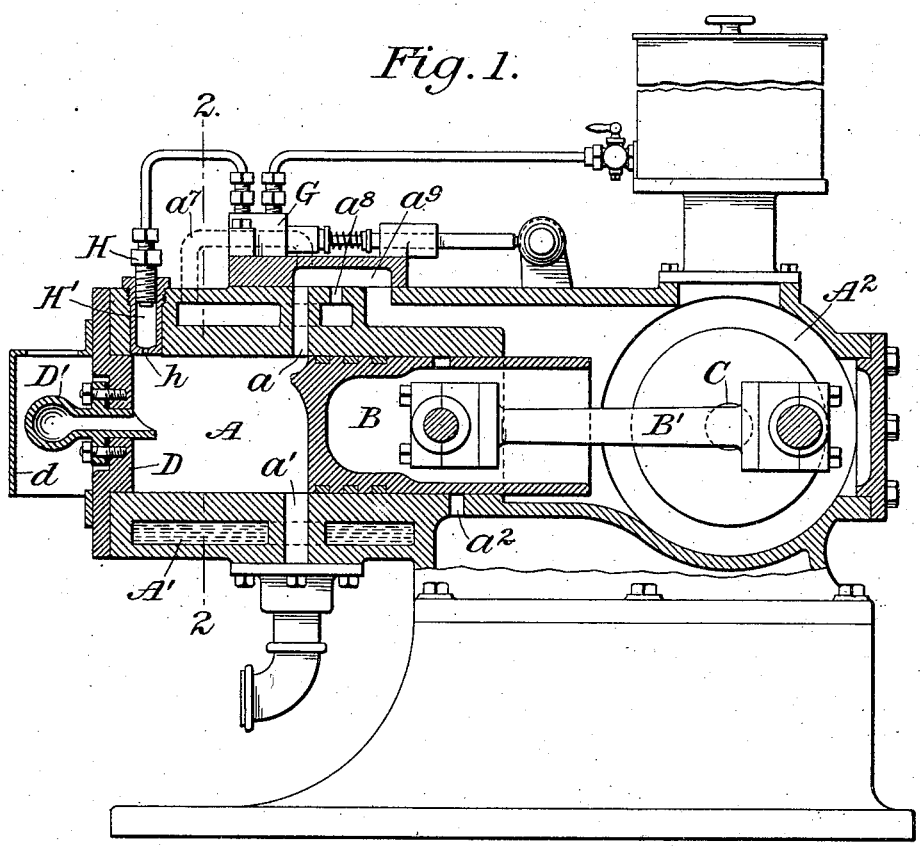
Figure 2:
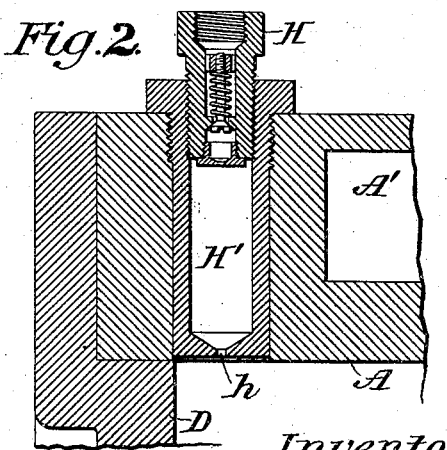

In the drawings, Figure 1 is a longitudinal central section of so much of an engine as is necessary to illustrate the application of the invention thereto. Fig. 2 is an enlarged detail view in section, showing the fuel-inlet and auxiliary chamber.

As usual in engines of the type represented in the drawings, the working cylinder A is provided with a trunk-piston B, connected by a pitman B' with a crank-shaft C, while the crank-chamber $A^2$ is inclosed, as usual, to permit of the compression by the forward stroke of the piston of the air required for the formation of each charge. The cylinder is also provided, as usual, with an inlet-port $a$, communicating with the crank-chamber $A^2$ and arranged to be uncovered by the piston as it approaches the limit of its forward movement, an exhaust-port $a'$, also arranged to be uncovered by the piston, preferably slightly in advance of the inlet-port $a$, and an air-port $a^2$, which is uncovered by the piston as it approaches the limit of its rearward movement, to admit air to the compression-chamber $A^2$.

The fuel basis of each charge may be supplied by a pump G, as usual, being delivered to a suitable nozzle H. The latter, however, does not open directly into the working cylinder or explosion-chamber. The oil is discharged thereby into an auxiliary chamber H', which communicates with the working cylinder or explosion-chamber through a comparatively small port $h$. After the compression of the charge previously formed in the working cylinder and when the piston has moved forward far enough to permit the pressure within the working cylinder to be somewhat reduced the air within the auxiliary chamber H', which has been under the full expansion pressure, rushes out through the comparatively small opening $h$ between the auxiliary chamber and the working cylinder, and as at this instant the oil is injected into the auxiliary chamber through the nozzle H it is sprayed by the escaping air directly into the working cylinder and is there mixed with the compressed air. Ignition takes place immediately within the compression-space and the piston is driven forward to the limit of its stroke. These actions follow in a regular cycle, the ignition and expansion of the charge taking place at each operation after compression and when the pressure in the working cylinder has been reduced slightly by the forward movement of the piston.

For ignition of the charge the head D of the cylinder may be provided with a closed tubular igniter D' of a well-known form, which is secured to the head D and is provided with an external jacket $d$ to facilitate the initial heating of the igniter before starting the engine.

The operation of the improved engine has been fully set forth in connection with the description of the construction thereof and requires no further explanation herein. It will be understood that the details of construction may be varied in each case, as convenience or the special requirements of each case may indicate, and that the invention is not limited to the particular construction and arrangement shown and described herein.

I claim as my invention—

1. In an internal-combustion engine, the combination of a working cylinder, an auxiliary chamber communicating with the working cylinder through a relatively small but unobstructed passage to receive air from the working cylinder during the compression-stroke and to discharge the same into the cylinder as the pressure therein is reduced, a vaporizer and igniter independent of said auxiliary chamber, and means to supply the fuel basis of the charge to said auxiliary chamber before the pressure in the cylinder is reduced, whereby the fuel basis of the charge is sprayed into the working cylinder by the air discharged from the auxiliary chamber and the pressure in the working cylinder is reduced, substantially as described.

2. In an internal-combustion engine, the combination of a working cylinder, an auxiliary chamber communicating with the working cylinder through a relatively small but unobstructed passage to receive air from the working cylinder during the compression-stroke and to discharge the same into the cylinder as the pressure therein is reduced, a nozzle through which the fuel basis of the charge is delivered to the auxiliary chamber, a vaporizer and igniter independent of said auxiliary chamber, and a pump timed to supply the fuel basis of the charge to said nozzle before the pressure in the cylinder is reduced, whereby the fuel basis of the charge is sprayed into the working cylinder by the air discharged from the auxiliary chamber and the pressure in the working cylinder is reduced, substantially as described.

This specification signed and witnessed this 23d day of June, A. D. 1903.

CARL W. WEISS.

In presence of—
ANTHONY N. JESBERA,
M. A. BRAYLEY.